UNITED STATES PATENT OFFICE.

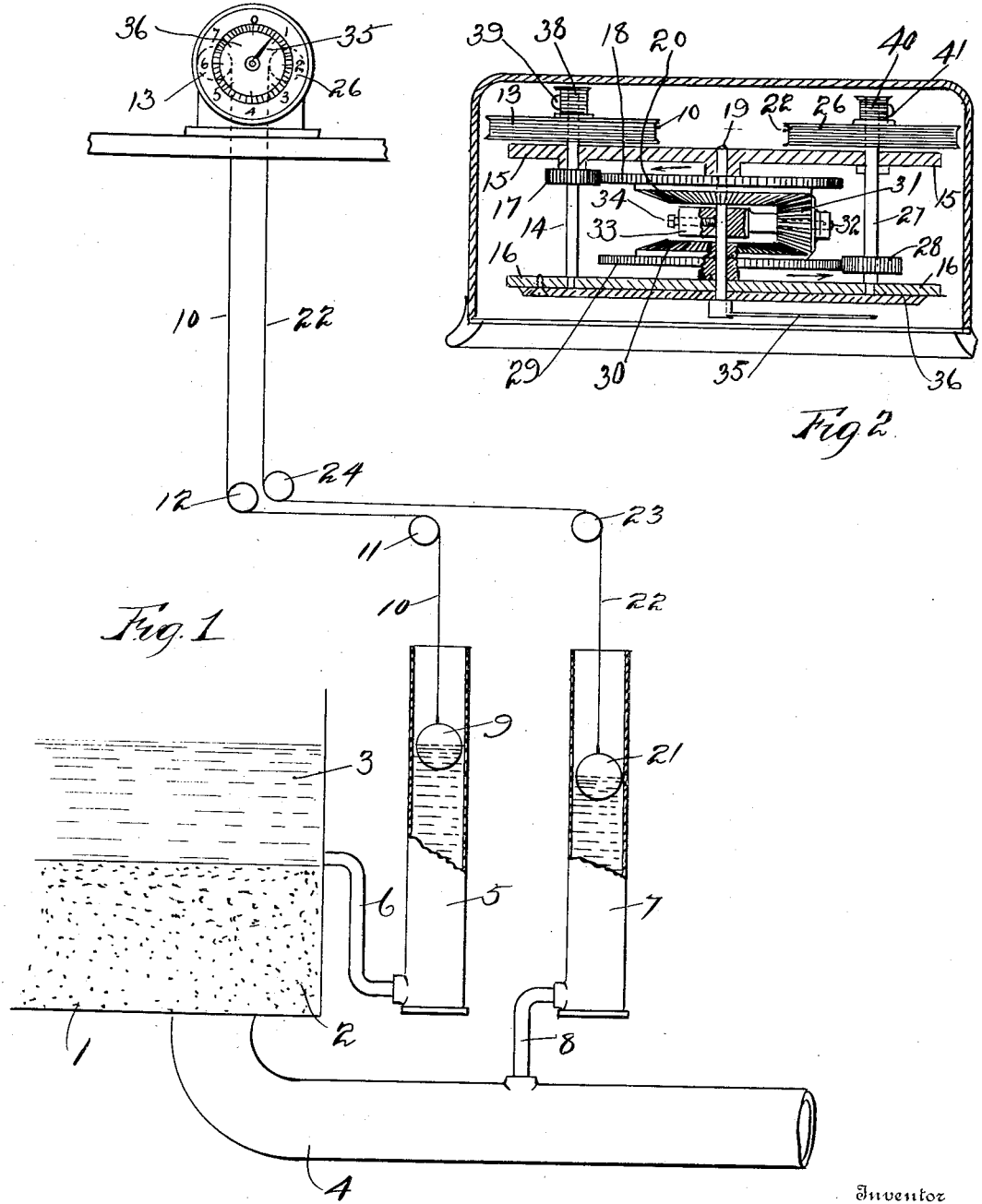

FREDERICK N. CONNET, OF PROVIDENCE, RHODE ISLAND.

INDICATOR DEVICE FOR RESERVOIR-FILTERS.

941,061.  Specification of Letters Patent.  Patented Nov. 23, 1909.

Application filed January 10, 1907. Serial No. 351,681.

*To all whom it may concern:*

Be it known that I, FREDERICK N. CONNET, a citizen of the United States, residing at the city of Providence, in the county of Providence and State of Rhode Island, have invented certain new and useful Improvements in Indicating Devices for Reservoir-Filters, of which the following is a specification, reference being had therein to the accompanying drawing.

My invention relates to indicating devices for reservoir filters, water-works, and the like, and has for its object to provide a gage of simple and practical construction that will indicate and show at a glance the difference between two liquid pressures or levels.

In the operation of filtration plants it is found necessary to be able to readily determine what is known as the loss of head or difference between the height of water in the filter basin and the pressure or height of the effluent, which difference may be due to the conditions of the filter bed or to various other causes.

A practical embodiment of the invention is represented in the accompanying drawings, forming a part of this specification in which similar characters of reference indicate corresponding parts in all the views.

In the accompanying drawings: Figure 1—is a diagrammatic view illustrating the application of my indicating device to a filtration plant showing one float, the position of which is controlled by the head in the filtration tank and another float controlled by the pressure or head of the effluent. Fig. 2—is an enlarged plan view partly in section showing the simple set of gearing by which the pointer is actuated to indicate the loss of head by the difference in the position of the two floats.

Referring to the drawings at 1 is the filter basin containing a bed of filtering substance 2 above which is the raw water 3 to be filtered. The large pipe 4 connected to the bottom of the filtering basin is to conduct the effluent or filtered water therefrom.

At 5 is an upright tube connected by means of the small pipe 6 to the basin 1 just above the filter bed, the water in said tube naturally rises to the level of that in the basin. At 7 is a corresponding tube which is connected by means of the pipe 8 to the effluent or main conducting pipe 4. The height of the water in tube 7 will be naturally somewhat lower than that in tube 5 owing to the loss of head due to the passing of the water through the filter. This loss of head may vary according to the condition of the filtering substance which sometimes becomes filled in or foul by the collection of foreign matter collected from the water as it passes therethrough.

In the tube 5 is the float 9 the position of which represents the height of the raw water. This float is connected through the cord 10 over the pulleys 11 and 12 to the operating drum 13. This drum is mounted on and fixed to one end of shaft 14, said shaft being journaled in the plates 15 and 16. Also mounted on the same shaft is the small drum 38 over which is hung the counterbalance weight 39 for returning the mechanism when the float 9 rises. Also mounted on and fixed to this shaft is the pinion 17 meshing into the gear 18 which gear is mounted to turn freely on the center shaft 19. Fixed to the inner face of gear 18 and arranged to turn with it is a beveled gear 20.

The float 21, the position of which representing the height of the effluent, is connected through its cord 22 over pulleys 23 and 24 to the drum 26 mounted on the shaft 27. This shaft, like shaft 14, is journaled in the plates 15 and 16 but on the opposite edge thereof. This shaft also, like said shaft 14, has mounted on its outer end the drum 40 over which is hung the counterbalance weight 41 which serves to turn the mechanism in the reverse direction when the float 21 rises. The pinion 28 is fixed to this shaft 27 and is arranged to mesh into and drive the large gear 29 which is loosely mounted on the shaft 19. On the inner face of this gear 29 is fixed the beveled gear 30 adapted to turn therewith. The beveled pinion 31 is mounted to turn freely on the pin 32 which pin is connected to the weighted or counterbalanced arm 33 which member is secured by means of the set screw 34 to the central shaft 19. This pinion 31 is arranged to fit between and engage both of the beveled gears 20 and 30 and is actuated by them to turn the indicating hand 35 mounted on the outer end of shaft 19 in a proportion due to the difference of the movement of said gears. This arrangement, which might be termed a planetary system of gearing, is the result or effect of one gear being moved about the axis of a second gear by the action of a third, the position or movement of said first gear around such axis being determined by the difference between the movements of said second and third gears.

At 36 is a face plate or dial permanently held in a fixed position to the bearing plate 16. This face plate may be suitably graduated with relation to the movement of the floats and actuating mechanism so that the position of the indicating hand moving over its face accurately indicates the difference between the height of the two floats.

As the pointer or hand 35 indicates the relative position of the two floats, when they are at the same level said hand will of course point straight upward at 0, and as the float 21 falls to maintain its usual position which is below that of the float 9, said hand is moved to the right to indicate the amount of difference through the movement of the mechanism as follows: The movement of float 9, the position of which is controlled by the height of the water in the reservoir, controls the movement of the gear 20 through the mechanism shown to rotate it either to the right or to the left, a distance in proportion to the movement of said float and the float 21 through a similar mechanism controls the movement of the gear 30 to rotate in the same proportion but in an opposite direction to that of gear 20, the result being that supposing float 9 was stationary, and float 21 should drop, then the gear 30 would be rotated in the direction indicated by the arrow and the pinion 31 meshing with both gears would be caused to revolve and be carried by the movement of gear 30 around the face of gear 20 a distance in proportion to the movement of the float 21. This motion of the gear 31 around the shaft 19, to which its support is fixed, carries with it, as above set forth, the indicating hand 35 which indicates the drop, difference in position between the two floats, or loss of head. My improved mechanism for accomplishing this purpose is extremely simple and effective.

Having thus described my invention, what I claim as new and desire to secure by Letters Patent, is:

1. An apparatus of the character described, comprising two independent floats arranged to be moved by two different bodies of liquid, a graduated dial, an indicating hand adapted to be moved over the face of said dial, two gears, means for operatively connecting said gears to said floats, a pinion actuated by each gear to be rotated about the axis of said gear, and means whereby said axial movement of said pinion carries said hand to indicate the relative positions of said floats.

2. An apparatus of the character described comprising two independent floats arranged to be moved by two different bodies of liquid, a fixed graduated dial, an indicating hand adapted to be moved over the face of said dial, a center shaft on which said hand is mounted, two gears loosely mounted on said shaft, means for connecting said gears to said floats whereby each gear is operated independently, an arm fixed to said shaft, a pinion mounted on said arm and meshing with both of said gears, whereby the difference between the movement of said floats acting through said gears and pinion is indicated by the hand on the dial.

In testimony whereof I affix my signature in presence of two witnesses.

FREDERICK N. CONNET.

Witnesses:
　WM. R. TILLINGHAST,
　HOWARD E. BARLOW.